Oct. 23, 1956  B. T. HENSGEN  2,768,083
CHEESE MANUFACTURE
Filed Feb. 15, 1952

BERNARD T. HENSGEN
INVENTOR.

BY R. L. Story

ATTORNEY

United States Patent Office 2,768,083
Patented Oct. 23, 1956

2,768,083
CHEESE MANUFACTURE

Bernard T. Hensgen, Chicago, Ill., assignor to Swift & Company, Chicago, Ill., a corporation of Illinois Application February 15, 1952, Serial No. 271,808

10 Claims. (Cl. 99—116)

The present invention relates to a method and apparatus for the cheddaring of cheese.

During the cheddaring process, at least three processing effects are performed on the cheese curd; i. e., (1) excess moisture is removed from the curd, (2) a cohesive curd is produced, and (3) acidity is developed. The conventional method of cheddaring is to allow blocks of the curd to stand for a period of time in a suitable draining area such as a metal trough. The blocks are turned periodically and in some instances are stacked on top of one another. A description of the conventional method may be found in the book "Cheese" by Van Slyke and Price, the disclosure of which is included herein by reference. The cheddaring process is described particularly on pages 172 to 176.

The principal object of the present invention is to provide a method and apparatus which will speed and facilitate the coherence and drainage of the curd. This is accomplished by applying a gradually increasing pressure to the blocks of curd, which pressure squeezes out the whey and compresses the curd into a more solid mass.

A further object is to provide a device which may be employed in continuous cheese making as distinguished from the batch methods found in conventional practices. This is accomplished by the novel conveyor type of cheddaring apparatus which has been devised. One feature of the invention is that, while it is contemplated that the apparatus will be used in a continuous process, it is adaptable, without modification, for use in batch operations.

Other objects and advantages include: the provisions to facilitate drainage of the whey from the conveyor, the provisions to provide a centering of the curd on the conveyor, and the simplicity in both structure and operation.

Additional objects will be apparent from the following description taken in conjunction with the drawings in which.

Figure 2:
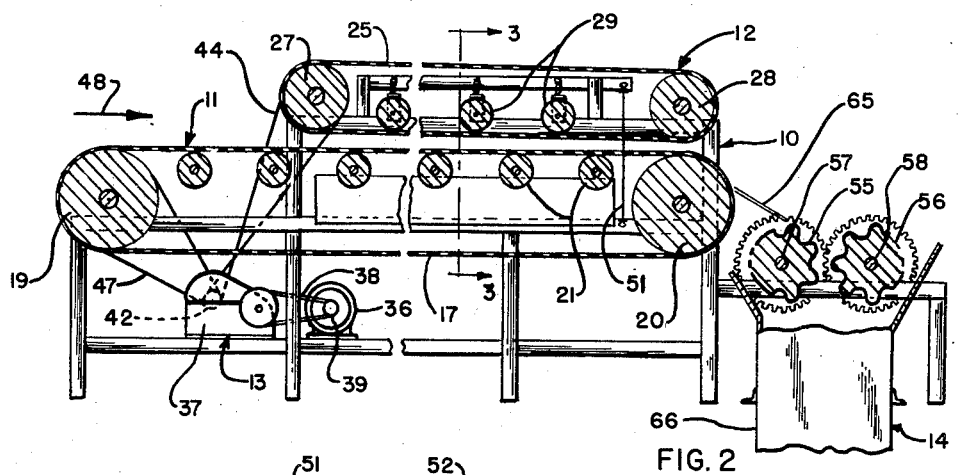
Fig. 2 is a section taken at line 2—2 of Fig. 1.

In the illustrated embodiment, a frame generally 10 supports a lower set of conveyor belts generally 11 and an upper set of conveyor belts generally 12. The upper and lower sets of belts are rotated by power-driving means generally 13. At the discharge end of belts 11 and 12 is a power-kneading apparatus generally 14.

The lower set of belts 11 are made up of three individual belts 16, 17, and 18. Belts 16, 17, and 18 are mounted over spaced rolls 19 and 20 suitably journaled in frame 10. A plurality of idler rolls 21 support the intermediate portions of the conveying run of a lower set of belts 11. Preferably rolls 19, 20, and 21 have a slight crown giving the individual belts 16, 17, and 18 a convex configuration as the belts traverse the conveying run.

Figure 3:
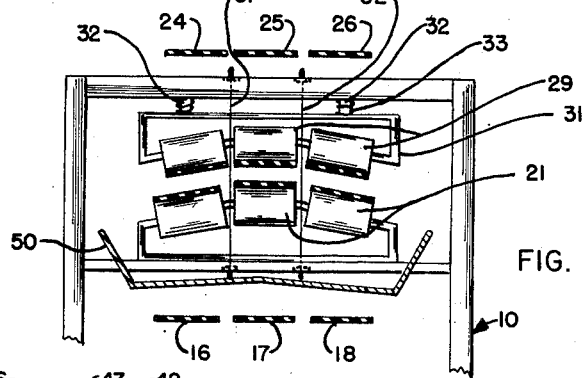
Fig. 3 is a section taken at line 3—3 of Fig. 2.
Figure 1:
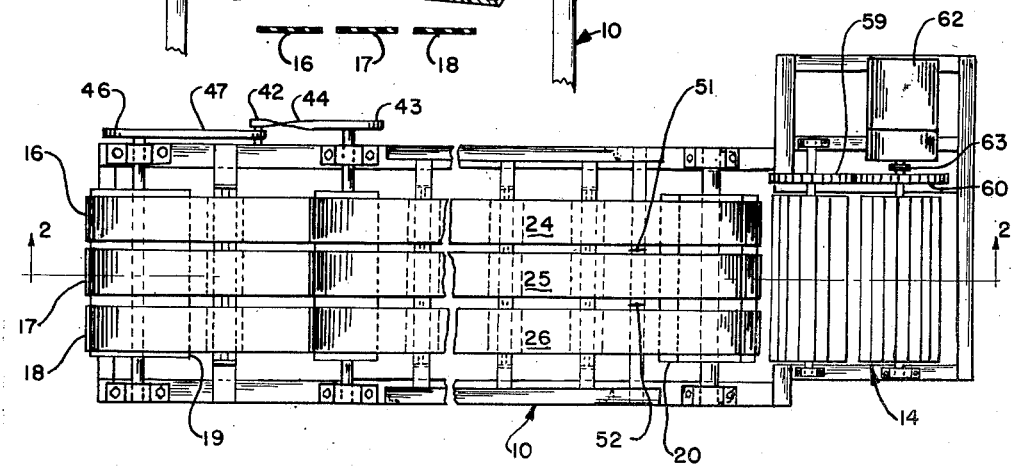
Fig. 1 is a plan view of an embodiment of the invention.

As will be seen in Fig. 3, idler rolls 21 are mounted in sets of three, with the two outside rolls slanted downwardly from the center of the three rolls. Due to this mounting, the lower set of belts 11 has a generally convex conveying surface.

The upper set of belts 12 is likewise made up of three individual belts 24, 25, and 26 which are mounted on spaced rolls 27 and 28. Rolls 27 and 28 are suitably journaled in frame 10 with roll 28 being spaced closer to the lower set of belts 11 than is roll 27. Intermediate of spaced rolls 27 and 28 are a plurality of idler rolls 29 which like the lower rolls 21 are mounted in sets of three with the outside two rolls of the three angling downward from the center roll thereof, thus giving the portions of belts 24, 25, and 26 facing belts 16, 17, and 18 a generally concave configuration. Individual rolls 27, 28, and 29 are each slightly dished, thus giving each belt 24, 25, and 26 a concave configuration.

Each set of rolls 29 is mounted on a yoke 31 mounted for limited vertical movement with respect to frame 21 by means of vertical posts 32 loosely received in openings in frame 21. Springs 33 about posts 32 urge yoke 31 downwardly to the extent permitted by the movement in posts 32.

Belts 16, 17, and 18 as well as upper belts 24, 25, and 26 are preferably fabric belts having a rubber or other moisture resistant impregnation.

Power-driving means 13 includes a motor 36 connected to a speed reducer 37 through a belt 38 and pulleys 39 and 40. A dual pulley 42 on the outside of speed reducer 37 is used to connect the power-driving means 13 to the upper set of belts 12 through a pulley 43, mounted on the shaft to which roll 27 is secured, and an interconnecting belt 44, and to drive the lower set of belts 11 through a pulley 46, mounted on the shaft to which roll 19 is secured, and an interconnecting belt 47. Belts 44 and 47 are mounted so that the upper set of belts and the lower set of belts 11 move in the same direction across the conveying portion of the latter belts. The direction of movement is indicated by arrow 48.

A pan 50 is mounted under the conveying run of the lower set of belts 11 to receive the whey extracted from the cheese curd during the cheddaring process. The pan has a suitable drain connection.

Adjacent the exit end of the conveying run is a curd slicing means which in the illustrated embodiment is a pair of wires 51 and 52 which are tightly stretched between portions of frame 10. Wire 51 passes between belts 24 and 25 and belts 16 and 17 while wire 52 passes between belts 25 and 26 and belts 17 and 18.

Kneading apparatus 14 includes a pair of spaced ridged rollers 55 and 56 mounted on shafts 57 and 58 respectively journaled in frame 10. At one end of shafts 57 and 58 are a pair of engaging gears 59 and 60 respectively. A speed-reducing motor 62 has its output shaft connected to shaft 58 by means of a coupling 63.

A chute 65 receives the curd from the conveying run of the lower set of belts 11 and delivers the curd to the kneading apparatus 14. A hopper or chute 66 receives the curd from the kneading apparatus 14.

In practice, the curd from which a portion of whey has been removed is placed upon the extended entrance end of the lower conveyor set 11. These cakes are moved in the direction of arrow 48 at a relatively slow rate of speed. Preferably the cakes of curd should be on the conveyor a sufficient time for the desired acidity to substantially develop. In the majority of instances approximately one-half hour will be required. As the curd passes through the cheddaring machine, it is gradually compressed by the decreasing space between the upper set of belts 12 and the lower set of belts 11. The gradual pressure applied by the two sets of conveyors to the curd cake squeezes the substantial portion of the remaining whey from the curd and knits the curd together into a unified mass. As the curd reaches the exit end of the cheddaring machine, the cake is divided by wires 51 and 52, which action facilitates the final removal of the whey and reduces the size of the cake into strips which are more convenient for handling than is the wide cake.

The toothed rollers 55 and 56 which are driven at a slow rate of speed by motor 62 further unify the curd by the kneading action obtained from the pressure exerted upon alternate sides of the curd cake. In some embodiments, it will be found that the curd cake is adequately unified as it is received from the conveyors so that the kneading apparatus 14 may be eliminated.

The handling of the curd after it has been cheddared is known to those skilled in the art. Briefly, the usual practices are to cut curd into small pieces, salt the curd, and place it into hoops. In the hoops, the curd is pressed for a varying period and then may be allowed to age or is shipped from the cheese factory for use.

As has been illustrated in the disclosed embodiment, the lower conveyor 11 preferably has a convex conveying surface and the upper pressing conveyor 12 preferably has a corresponding concave surface. The use of conveyors so shaped not only facilitates the drainage of the whey during the pressing process but also aids in centering the curd cake upon the lower conveyor. In some embodiments the conveyors may be completely flat, while in others the individual belts may be flat or the belts positioned not at an angle to each other.

The applicant has disclosed the preferred method and apparatus in accordance with the requirements of Section 4888 of the Revised Statutes. However, this disclosure of a specific embodiment should not be construed as imposing unnecessary limitations upon the appended claims. Modifications thereof will be apparent to those skilled in the art and such modifications are deemed to be within the scope of the applicant's invention to the extent that they are covered by the appended claims. Obvious modifications would include the use of a single belt without the side belts of sets 11 and 12, as has been discussed, and the elimination of the upper belts 24, 25, and 26 using only a plurality of rollers 27, 28, and 29 to apply pressure to the curd cake.

I claim:

1. Cheese manufacturing apparatus for cheddaring the curd, said apparatus including a conveyor having a conveying surface along which the curd is moved in a given direction, said conveying surface being elongated in said direction and being convex when viewed in a section transverse to said direction, and pressure means positioned above said surface to cooperate with said surface to squeeze said curd, said pressure means also being elongated in said direction with the portion thereof adjacent said surface of a concave configuration when viewed in a section transverse to said direction.

2. Cheese manufacturing apparatus for cheddaring the curd, said apparatus including a conveyor having a convex conveying surface, and pressure means positioned above said surface to cooperate with said surface to squeeze said curd said pressure means having the portion thereof adjacent said surface of a concave configuration, said pressure means extending along a portion of said conveyor, said pressure means being positioned closer to said conveyor at the exit end, with respect to the direction of movement of the curd on said conveyor, than it is at the entrance end of said portion.

3. Cheese manufacturing apparatus for cheddaring the curd, said apparatus including a conveyor having a conveying surface along which the curd is moved in a given direction, said conveying surface being elongated in said direction and being convex when viewed in a section transverse to said direction, and pressure means positioned above said surface to squeeze said curd, said pressure means including a plurality of concave spools positioned sequentially in the said direction, said spools being mounted for rotation about the longitudinal axes of the spools, the axes of said spools being generally normal to said direction and generally parallel to a tangent of said surface.

4. Cheese manufacturing apparatus for cheddaring the curd, said apparatus including a conveyor having a convex conveying surface, and pressure means positioned above said surface to squeeze said curd, said pressure means including a plurality of concave spools positioned above said surface, said spools being mounted for rotation about the longitudinal axes of the spools, the position of the successive spools, with respect to the direction of movement of the curd along the conveyor, being closer to said surface.

5. Cheese manufacturing apparatus for cheddaring the curd, said apparatus including a belt conveyor means, the conveying surface of said belt being convex, power-driving means to move said belt, inclined drain troughs below said belt, a plurality of concave spools mounted above said surface for rotation about the longitudinal axes of said spools, and a belt about said spools.

6. Cheese curd cheddaring apparatus including a plurality of belts making up a first set, supporting rolls for said belts, said rolls being positioned so that at least a portion of said belt form a generally convex conveying surface, a plurality of belts making up a second set, supporting rolls for said second set of belts, said last-mentioned rolls being so positioned that said second set of belts is over said first set and at least a portion of the part of said second set immediately adjacent said surface presents a generally concave surface toward said convex conveying surface, and power-driving means operatively connected to said belts to move said portions of said belts in the same direction, said rolls being so mounted with respect to each other that said sets of belts gradually approach each other with respect to the direction of movement of the belts.

7. Cheese curd cheddaring apparatus including a plurality of belts making up a first set, supporting rolls for said belts, said rolls being positioned so that at least a portion of said belts form a generally convex conveying surface, a plurality of belts making up a second set, supporting rolls for said second set of belts, said last-mentioned rolls being so positioned that said second set of belts is over said first set and at least a portion of the part of said second set immediately adjacent said surface presents a generally concave surface toward said convex convex conveying surface, power-driving means operatively connected to said belts to move said portions of said belts in the same direction, said rolls being so mounted with respect to each other that said sets of belts gradually approach each other with respect to the direction of movement of the belts, and slitting means positioned between adjacent belts transverse to said direction of movement to cut the pressed curd into longitudinal strips.

8. Cheese manufacturing apparatus for cheddaring the curd, said apparatus including a conveyor having a convex conveying surface, pressure means positioned above said surface to cooperate with said surface to squeeze said curd, said pressure means having the portion thereof adjacent said surface of a concave configuration, and a pair of spaced power-driven rolls positioned to receive the curd from said conveyor, said rolls having projections thereon to knead the pressed curd.

9. The method of cheddaring a cake of cheese curd forming a concave configuration across the bottom of the cake, forming a convex configuration across the top of the cake, and gradually applying increased pressure to the top and bottom of the cake during the major portion of the period of time required to develop the desired acidity in the curd.

10. The method of cheddaring a cake of cheese curd forming a concave configuration across the bottom of the cake, forming a convex configuration across the top of the cake, gradually applying increased pressure to the top and bottom of the cake during the major portion of the period of time required to develop the desired acidity in the curd, and kneading the curd after said pressure is removed.

References Cited in the file of this patent

UNITED STATES PATENTS 680,051    Lueteke _____ Aug. 6, 1901

OTHER REFERENCES

Bulletin No. 608, revised February 1932, U. S. Dept. of Agriculture; Varieties of Cheese: Descriptions and Analyses, pages 10 and 11 Cheddar, and page 11 Cheshire.